(12) United States Patent
Siatkowski

(10) Patent No.: US 7,980,021 B2
(45) Date of Patent: Jul. 19, 2011

(54) APPARATUS AND METHOD FOR SECURING A BAIT FISH TO A FISH HOOK

(76) Inventor: Gerard Siatkowski, Miami, FL (US)

( * ) Notice: Subject to any disclaimer, the term of this patent is extended or adjusted under 35 U.S.C. 154(b) by 29 days.

(21) Appl. No.: 12/498,454

(22) Filed: Jul. 7, 2009

(65) Prior Publication Data

US 2010/0005704 A1    Jan. 14, 2010

Related U.S. Application Data

(60) Provisional application No. 61/079,249, filed on Jul. 9, 2008.

(51) Int. Cl.
*A01K 83/06* (2006.01)
(52) U.S. Cl. .............................. 43/44.6; 43/44.8; 43/44.2
(58) Field of Classification Search ................... 43/44.2, 43/44.4, 44.6, 44.8
See application file for complete search history.

(56) References Cited

U.S. PATENT DOCUMENTS

| | | | | |
|---|---|---|---|---|
| 600,241 A * | 3/1898 | Walker | ........................... | 43/44.6 |
| 608,348 A * | 8/1898 | Stadel | ........................... | 43/44.6 |
| 699,304 A * | 5/1902 | Gebhardt | ........................... | 43/44.6 |
| 740,416 A * | 10/1903 | Gebhardt | ........................... | 43/44.6 |
| 794,352 A * | 7/1905 | Gebhardt | ........................... | 43/44.6 |
| 841,951 A * | 1/1907 | Evans | ........................... | 43/44.4 |
| 863,272 A * | 8/1907 | Gebhardt | ........................... | 43/44.8 |
| 1,114,698 A * | 10/1914 | Lane | ........................... | 43/44.4 |
| 1,325,530 A * | 12/1919 | Ore | ........................... | 43/44.2 |
| 1,730,957 A * | 10/1929 | Valiga | ........................... | 43/44.4 |
| 1,745,169 A * | 1/1930 | Johnson | ........................... | 43/44.6 |
| 2,074,540 A * | 3/1937 | Dorsey | ........................... | 43/44.6 |
| 2,150,874 A * | 3/1939 | Wagner | ........................... | 43/44.4 |
| 2,402,730 A * | 6/1946 | Bucks | ........................... | 43/44.4 |
| 2,425,587 A * | 8/1947 | Zuravsky | ........................... | 43/44.6 |
| 2,463,369 A * | 3/1949 | Finlay et al. | ........................... | 43/44.4 |
| 2,533,390 A * | 12/1950 | Miller | ........................... | 43/44.6 |
| 2,583,680 A * | 1/1952 | Brennan | ........................... | 43/44.6 |
| 2,588,526 A * | 3/1952 | Hoage | ........................... | 43/44.6 |
| 2,767,505 A * | 10/1956 | Noyd | ........................... | 43/44.6 |
| 2,926,453 A * | 3/1960 | Miller et al. | ........................... | 43/44.6 |
| 2,927,393 A * | 3/1960 | Flamisch et al. | ........................... | 43/44.6 |
| 2,932,116 A * | 4/1960 | Woodzick | ........................... | 43/44.6 |
| 2,972,831 A * | 2/1961 | Anselmi | ........................... | 43/44.6 |

(Continued)

FOREIGN PATENT DOCUMENTS

EP            689764 A1 *   1/1996

(Continued)

*Primary Examiner* — Darren W Ark
(74) *Attorney, Agent, or Firm* — Mark D. Brown, Esq; Malin Haley DiMaggio; Bowen & Lhota, P.A.

(57) ABSTRACT

An improved self-engaging bait fish rig and assembly device which does not require the use of any sort of tool or device to engage the fish is disclosed. The rig is made of pliable metal prongs which have sufficient strength to hold a bait fish once engaged. The prongs are formed in a bent fashion with acute angles turned inward and upward towards the center of the rig. The rig attaches to the hook by way of rubber o-ring, which allows for movement of the rig along the hook. The prongs of the rig are spring-biased, thereby resetting the spring action to the closed position while in use. Such spring closure is reinforced by a rubber o-ring that encircles both prongs allowing for flexibility in stretching the prongs apart for insertion into the body or eyes of the fish.

4 Claims, 2 Drawing Sheets

U.S. PATENT DOCUMENTS

| | | | | |
|---|---|---|---|---|
| 2,972,832 A * | 2/1961 | Anselmi | | 43/44.6 |
| 2,982,049 A * | 5/1961 | Yost | | 43/44.8 |
| 3,105,319 A * | 10/1963 | Whalen | | 43/44.8 |
| 3,193,965 A * | 7/1965 | Jacobsen | | 43/44.6 |
| 3,200,532 A * | 8/1965 | Walton | | 43/44.6 |
| 3,271,890 A * | 9/1966 | Davis | | 43/44.4 |
| 3,396,485 A * | 8/1968 | Kuntz | | 43/44.8 |
| 3,415,004 A * | 12/1968 | Whalen | | 43/44.6 |
| 3,541,719 A * | 11/1970 | Temple | | 43/44.6 |
| 3,738,049 A * | 6/1973 | Garza | | 43/44.4 |
| 3,748,773 A * | 7/1973 | Goforth | | 43/44.6 |
| 3,774,337 A * | 11/1973 | Desbois | | 43/44.6 |
| 3,839,815 A * | 10/1974 | Latham | | 43/44.4 |
| 3,958,355 A * | 5/1976 | Findon | | 43/44.2 |
| 4,067,135 A * | 1/1978 | Martin | | 43/44.6 |
| 4,189,860 A * | 2/1980 | Ebert | | 43/44.4 |
| 4,221,069 A * | 9/1980 | Esses | | 43/44.2 |
| 4,554,756 A * | 11/1985 | Thomas | | 43/44.2 |
| 4,625,451 A * | 12/1986 | Griffiths | | 43/44.6 |
| 4,646,464 A * | 3/1987 | Wyatt | | 43/44.4 |
| 4,691,467 A * | 9/1987 | Brimmer | | 43/44.8 |
| 4,910,907 A * | 3/1990 | Schlaegel | | 43/44.6 |
| 4,934,092 A * | 6/1990 | Simmons et al. | | 43/44.6 |
| 5,027,544 A * | 7/1991 | Schlaegel | | 43/44.6 |
| 5,117,575 A * | 6/1992 | Desmond | | 43/44.8 |
| 5,189,826 A * | 3/1993 | Schlaegel | | 43/44.6 |
| 5,313,736 A * | 5/1994 | Rosenberg et al. | | 43/43.16 |
| 5,339,559 A * | 8/1994 | Strobbe | | 43/44.8 |
| 5,617,668 A * | 4/1997 | Shimandle | | 43/44.8 |
| 5,784,827 A * | 7/1998 | Jimenez et al. | | 43/44.8 |
| 6,050,023 A * | 4/2000 | Newell | | 43/44.6 |
| 6,665,978 B1 * | 12/2003 | Reed | | 43/44.4 |
| 6,675,526 B1 * | 1/2004 | Baron | | 43/42.36 |
| 7,257,923 B1 * | 8/2007 | Urbano, Jr. | | 43/44.2 |
| 7,424,786 B1 * | 9/2008 | Nelson et al. | | 43/43.16 |
| 7,481,019 B2 * | 1/2009 | Rosenberg | | 43/44.6 |
| 2005/0044772 A1 * | 3/2005 | Lillard, II | | 43/44.6 |
| 2005/0072038 A1 * | 4/2005 | Daley | | 43/44.4 |
| 2006/0143973 A1 * | 7/2006 | Corbitt, III | | 43/44.8 |
| 2007/0089353 A1 | 4/2007 | Rosenberg | | |
| 2009/0100737 A1 * | 4/2009 | Hunter | | 43/44.4 |
| 2009/0205243 A1 * | 8/2009 | Calderwood | | 43/44.8 |

FOREIGN PATENT DOCUMENTS

| | | | |
|---|---|---|---|
| EP | 1541020 A1 * | 6/2005 | |
| FR | 2625408 A1 * | 7/1989 | |
| FR | 2790361 A1 * | 9/2000 | |
| FR | 2809283 A1 * | 11/2001 | |
| FR | 2840156 A1 * | 12/2003 | |
| FR | 2849577 A1 * | 7/2004 | |
| GB | 2410880 A * | 8/2005 | |
| WO | WO 2004021776 A1 * | 3/2004 | |
| WO | WO 2005048701 A1 * | 6/2005 | |

\* cited by examiner

US 7,980,021 B2

APPARATUS AND METHOD FOR SECURING A BAIT FISH TO A FISH HOOK

CROSS REFERENCE TO RELATED APPLICATIONS

This application claims the benefit of provisional U.S. Patent Application Serial No. 61/079-249, filed on Jul. 9, 2008.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

The present invention relates to fishing rigs, and more particularly to an apparatus and method for securing a live bait fish to a fish hook without the need for a specialized rigging tool or device.

2. Description of Related Art

A fishing rig is one element of a fishing assembly consisting of rod, reel, line, hook, and rig. This rig device holds live bait-fish securely to the line and/or hook of the assembly in order to attract and capture the attention of desired game fish. As bait fish are alive when rigged, there exists a need for quick and easy attachment of the rig to the fish. The point where the rig engages the fish is essential to the functionality of the bait. Proper placement is required; depending on the particular bait fish used, rigs may be attached through the eyes, dorsal fin or tail of the fish. Traditionally, such rigs required a multi-step approach to securing such a bait fish to the rig, regardless of the placement. Current art, as exemplified in published U.S. Patent Application Publication No. US 2007/10089353 to Rosenberg reveals an apparatus and method for securing a bait fish that requires the use of a tool, such as crimping pliers for the purpose of "bending" of the rig. Proper "bending" allows the rig to remain attached to the bait fish throughout the fishing process. If the rig should happen to disengage from the bait as a result of improper "crimping", the fish would be lost to the open waters, thereby causing a loss to the angler of cost the bait and lost of opportunity of a game fish catch. In addition, if the rigging tool is lost overboard or malfunctions in any way, the rigging process and therefore the fishing excursion may be interrupted. The prior art is lacking an efficient method to attach a rig to a live bait fish without the use of a tool.

In addition, the use of circle hooks has become increasingly common. A circle hook is a type of fish hook which is sharply curved back in a circular shape. It has become widely popular among anglers in recent years because it hooks fish at a much higher percentage and rarely is swallowed by a fish (causing the hook to set in the gills or vital organs) and thus greatly decreases the mortality rates of released fish. The science behind a circle hook revolves around the fact that its unique shape allows it to only hook onto an exposed surface, which in the case of a fish means the corner of its mouth. The fish takes the baited hook and swallows it. As you reel in, the hook is safely pulled out of the fish until it reaches the mouth. At this point it will catch the corner of the mouth of the fish. The result is fewer gut-hooked fish. The use of a circle hook, however, demands that the hook be capable of swiveling relative to the bait fish. The bait rig structure disclosed by Rosenberg fails to allow such swiveling and thus functions poorly when used with a circle hook.

Accordingly, there exists a need for an improved apparatus and method for securing a bait fish that overcomes the limitations and disadvantages present in the art.

BRIEF SUMMARY OF THE INVENTION

The present invention overcomes the limitations and disadvantages present in the art by providing a self-engaging bait fish rig, particularly effective when used with a circle hook, designed for insertion into the various parts of the bait fish by a hand-held insertion of the rig directly into the fish. In a preferred embodiment, the present invention includes a metal two-pronged, spring-biased apparatus with an end having acute-angled bends for engagement into the bait. Such device features a specially formed and angled wire apparatus, having bait fish engaging prongs biased to a closed configuration by a resilient band. As the rig is positioned around the eyes or body of the fish, the spring-biased rig permits sufficient separation of the prongs to allow for ease of attachment. Once the fish is in place, the resilient band urges the prongs to the closed configuration whereby the bait fish is secured and preventing the disengagement of the rig from the fish. The process does not require the use of any tool or device to bend, insert, shape, crimp, or otherwise attach the rig to the fish itself. The rig is attached directly to the hook of the fishing assembly by way of a second resilient band thereby connecting the two-prong wire apparatus to the hook and allowing a desired degree of freedom of movement of the rig relative to the hook.

Accordingly, it is an object of the present invention to provide improvements to bait fish rigs.

Another object of the present invention is to provide a process by which such rigs can be utilized without the requirement of a rigging tool device.

Another object of the present invention is to identify an improved formation (structure, design) of the rig so that it does not require the "bending", "forming", "crimping", or other adjusting of the device during the process of engaging with the bait fish in order obtain functionality of the apparatus.

Another object of the present invention is to prevent the unintentional escape of the bait fish from the rig during the fishing process.

These and other objects are met by the present invention which will become more apparent from the accompanying drawing and the following detailed description of the drawings and preferred embodiments.

DETAILED DESCRIPTION OF THE INVENTION

Figure 1:
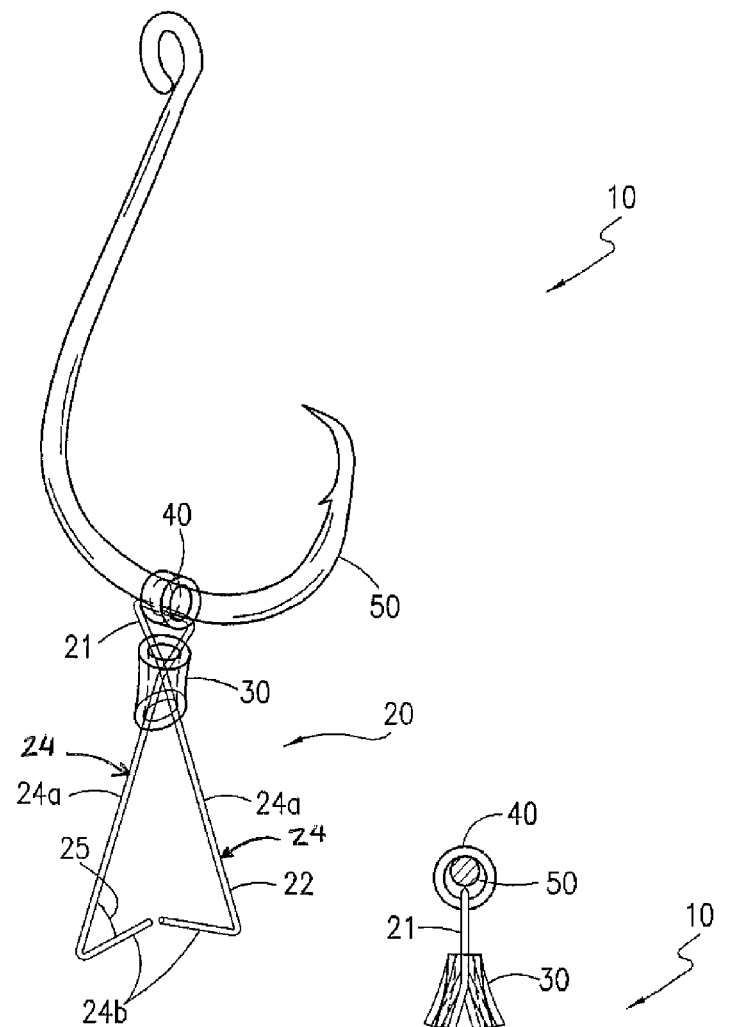
FIG. 1 is a side view of the hook and rig assembly in accordance with the present invention.
Figure 2:
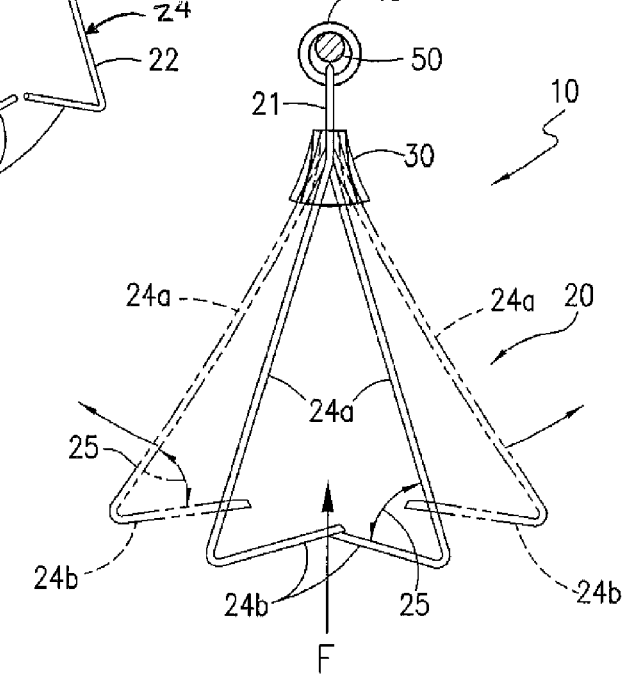
FIG. 2 is a front view of the rig illustrating the spring-biased prongs.

With reference to the drawings, FIG. 1 depicts a bait fish rig and hook assembly, generally referenced as 10, in operative relation. Bait rig and hook assembly 10 includes a wire-type bait rig apparatus 20 in accordance with the present invention, including first and second resilient bands, referenced 30 and 40, that may be attached to a fishing hook 50. Bait rig 20 preferably comprises a wire structure having a first end 21 and a second end 22 that is twisted approximately 90-degrees relative to first end 21. First end 21 defines a loop, and a second end 22 is formed to include two inwardly facing opposing prongs 24, which are bent inward in relation to the wire structure, to from an acute angle, referenced as 25. More particularly, each prong 24 includes a main prong body 24a projecting away from first end 21 in diverging relation with the opposing prong body, and a prong end or tip 24b preferably forms an acute angle 25 relative to main prong body 24a and projects generally toward the opposing prong tip. As a result, the prongs 24 are angled in an upward and inward direction as illustrated in FIG. 2 so as to form a generally recessed or concave second end for receiving a bait fish. The prong tips terminate in proximal relation and may be spaced, in contact, or in overlapping relation. As noted above, first end 21 forms a loop that falls generally within a first plane and the second end includes prongs 24 projecting from the first end 21 which prongs generally fail within a second plane that is disposed at a generally 90-degree twist angle is relative to the first plane.

A further significant aspect of the present invention involves the use of resilient bands. More particularly, a first resilient band 30 is disposed in surrounding relation with prongs 24 of the rig 20. As shown in FIG. 2, resilient 30 provides a spring-biasing of prongs 24 to the closed position (shown in solid line), as oppose to the open configuration (shown in phantom). As should be apparent, bait rig 20, and more particularly prongs 24 are biased to the closed configuration by both the spring nature of the wire structure and the resilient nature of band 30. A second resilient band 40 functions to connect the first end 21 of rig 20 to a fishing hook 50 as illustrated in FIG. 1. The use of a second resilient band to connect rig 20 to fishing hook 50 is significant in that it allows approximately 180-degree rotation of rig 20 relative to hook 50 thereby providing more natural and extensive movement than prior art rigs. In a preferred embodiment, first and second resilient bands 30 and 40 comprise elastic bands or O-rings.

FIG. 2 illustrates the separation of prongs 24 upon insertion of a bait fish therebetween, which bait fish is represented by application of a longitudinal force "F". Insertion of the bait fish thus results in a temporary separation of prongs 24 due to the acute angle 25 that results in the prong ends to from an angularly concave bait fish receiving area that naturally urges prongs 24 apart a the body of the bait fish is inserted. A spring bias, created in large part by resilient band 30, causes prongs 24 to return to the position shown in solid line in FIG. 2. Accordingly, as seen in FIG. 2, prongs 24 are manually configurable upon insertion of a bait fish between a normally closed configuration (shown in solid line) and an open configuration (shown in phantom line).

As best illustrated by FIGS. 1 and 2, a further significant aspect of the present invention relates to the formation of a loop at the first end 21 of bait rig 20 within a first plane, and the formation of prongs 24 within a second plane, with the first and second planes disposed generally perpendicular to one another. This configuration allows for the hook 50 to generally lie in alignment with the bait fish. More particularly, hook 50 will be disposed with the hook end/barb upward with the fish in a normal swimming position. As noted above, a further significant advantage of the present invention involves providing a resilient connection between the rig 20 and hook 50, which connection is provided by second resilient band 40. The use of a second resilient band to connect rig 20 to fishing hook 50 is significant in that it allows approximately 180-degree rotation of rig 20 relative to hook 50 thereby allowing the hook to rotation relative to the bait. The ability to allow the hook to rotate relative to the bait is significant particularly when the rig is used with a circle hook the use of which generally requires that the hook be allowed to swivel relative to the bait in order to hook the fish. This feature also allows for large hooks to be used with small bait fish, and has been found to prevent the hook from hooking the bait fish.

Figure 3:
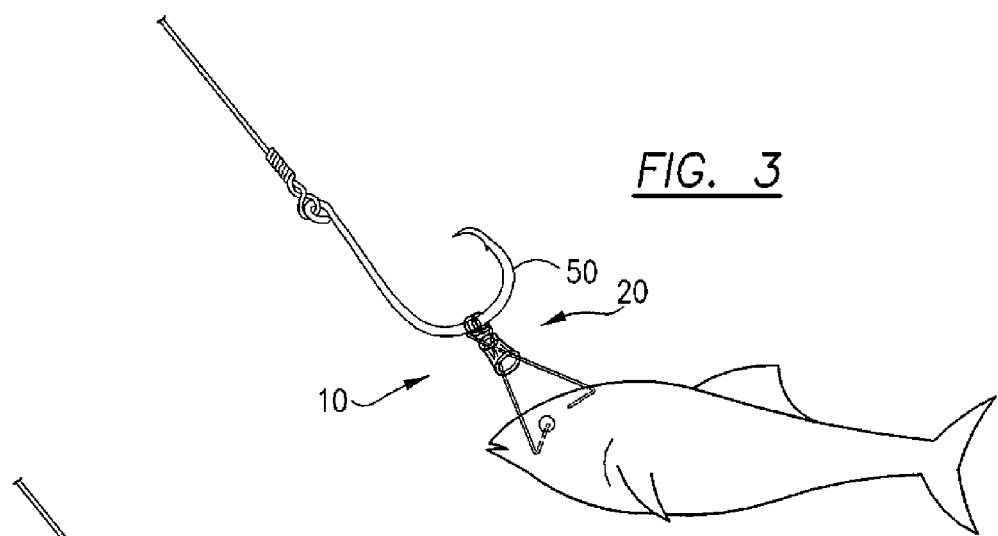
FIG. 3 is a view of the rig assembly as inserted into the eye sockets of the bait fish.
Figure 4:
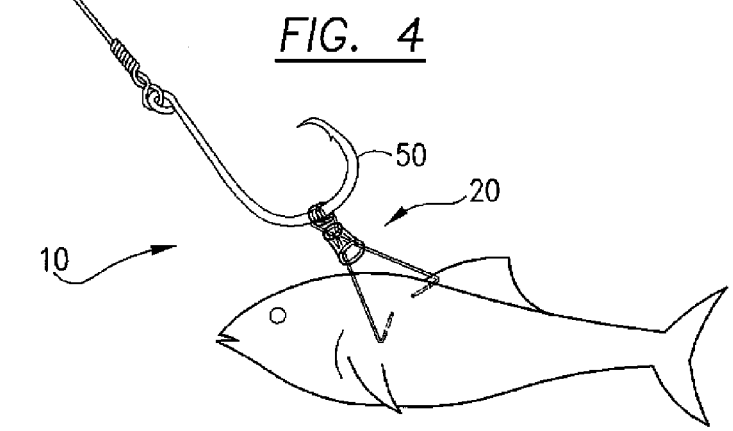
FIG. 4 is a view of the rig assembly as inserted into the front of the dorsal fin of the bait fish.
Figure 5:
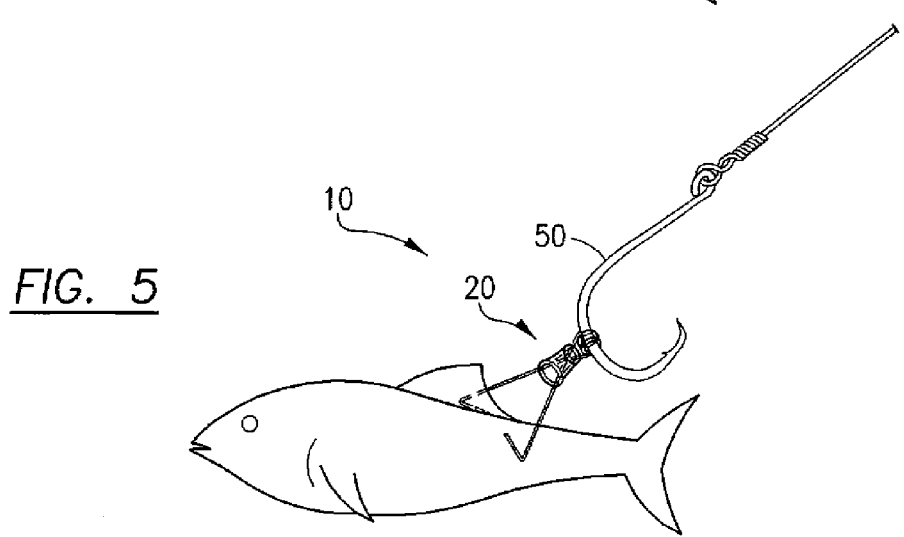
FIG. 5 is a view of the rig assembly as inserted into the rear of the dorsal fin of the bait fish.

FIGS. 3-5 generally illustrate a bait rig and hook assembly 10, and specifically the placement of rig 20, when applied to secure a fish. More particularly, FIG. 3 illustrates the placement of rig 20 such that prongs 24 engage the eye sockets of the bait fish. FIG. 4 illustrates the placement of rig 20 such that the prongs engage the frontal side of the dorsal fin of the bait fish. FIG. 5 illustrates the placement of rig 20 such that the prongs engage the rear side of the dorsal fin of the bait fish. As should now be apparent from the description herein and the illustrations, upon engagement with the fish, prongs 24 first separate to accommodate the body of the bait fish, and then automatically return by spring tension applied by resilient band 30 to a generally closed configuration whereby prongs 24 puncture the anatomy of the bait fish thereby preventing the fish from unintentional release.

The present invention thus provides a bait fish rig that is simple and easy to install without a tool or other specialized device. A bait rig in accordance with the present invention maybe affixed to the bait fish prior to connection to the hook, or may be attached to the hook prior to affixing the bait fish. In addition, the use of resilient band with the bait fish rig disclosed herein renders the rig completely reusable.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A fishing bait rig for attaching a bait fish to a hook, said bait rig comprising:
   a wire structure having a first end portion and a second end portion;
   said first end portion defining a loop;
   a first resilient band disposed on said first end portion loop for removably attaching the rig to the hook, said first end portion loop having a portion which extends through an interior defined by said first resilient band such that said first resilient band both circumscribes said portion of said first end portion loop and extends through an interior defined by said first end portion loop;
   said second end portion including a pair of opposing prongs projecting from said first end portion, each of said prongs including a main body prong and an inwardly disposed prong tip;
   said first end portion generally falls within a first plane and said second end portion generally falls within a second plane;

said first plane being generally perpendicular to said second plane;

said main prong bodies projecting from said first end portion in a generally diverging configuration;

each of said prong tips forming a generally acute angle relative to its corresponding main prong body such that each of said prong tips projects towards the opposing prong tip, such that said prong tips generally form a concavely shaped said second end portion;

said prongs configurable between a normally closed configuration wherein said prong tips are substantially adjacent each other and an open configuration wherein said prong tips are spaced from each other; and said prongs biased toward said closed configuration.

2. A fishing bait rig according to claim 1, wherein the insertion of the bait fish into said concavely shaped second end portion causes said prongs to separate from said normally closed configuration to an open configuration whereafter resilient bias causes said prong tips to pierce the bait fish thereby removably securing the bait fish.

3. A fishing bait rig according to claim 1, further including a second resilient band disposed in surrounding relation to said wire structure and generally disposed between said first and second ends, said second resilient band functioning to bias said prongs to said closed configuration.

4. A self-engaging fishing bait rig for attaching a bait fish to a hook, said bait rig comprising:

a wire structure having a first end portion and a second end portion;

said first end portion defining a loop;

said second end portion including a pair of opposing prongs projecting from said first end portion, each of said prongs including a main prong body and an inwardly disposed prong tip;

said main prong bodies projecting from said first end portion in a generally diverging configuration;

each of said prong tips forming a generally acute angle relative to its corresponding main prong body and oriented such that each of said prong tips projects toward the opposing tip, such that said prong tips generally form a concavely shaped said second end portion;

said first end portion loop generally falling within a first plane and said second end portion generally falling within a second plane, said first plane being generally perpendicular to said second plane;

said prongs configurable between a normally closed configuration wherein said prong tips are substantially adjacent each other and an open configuration wherein said prong tips are spaced from each other;

said prongs resiliently biased toward the closed configuration;

a first resilient band disposed between said first and second end portions in surrounding relation with said wire structure;

a second resilient band disposed on said first end portion loop for removably attaching the rig to the hook, said first end portion loop having a portion which extends through an interior defined by said second resilient band such that said second resilient band both circumscribes said portion of said first end portion loop and extends through an interior defined by said first end portion loop; and whereby the insertion of the bait fish into said concavely shaped second end portion causes said prongs to separate from said normally closed configuration to an open configuration whereafter resilient bias causes said prong tips to pierce the bait fish thereby removably securing the bait fish.

\* \* \* \* \*